United States Patent [19]

Inoue

[11] Patent Number: 4,955,407

[45] Date of Patent: Sep. 11, 1990

[54] CHECK VALVE INSERTABLE INTO A HOSE

[75] Inventor: Yoshimichi Inoue, Saitama, Japan

[73] Assignee: Jidosha Kiki Co., Ltd., Tokyo, Japan

[21] Appl. No.: 315,445

[22] Filed: Feb. 24, 1989

[30] Foreign Application Priority Data

Mar. 8, 1988 [JP] Japan ............................. 63-30698[U]
Mar. 25, 1988 [JP] Japan ............................. 63-39365[U]

[51] Int. Cl.$^5$ ............................................. F16K 15/06
[52] U.S. Cl. .................. 137/454.2; 137/543; 156/73.1; 251/367
[58] Field of Search ............ 137/454.2, 515, 542, 137/543; 251/366, 367; 285/238, 239; 156/73.1

[56] References Cited

U.S. PATENT DOCUMENTS

| | | | |
|---|---|---|---|
| 1,166,059 | 12/1915 | Ledbetter | 285/239 |
| 1,994,784 | 3/1935 | Porzel | 285/239 |
| 2,418,448 | 4/1947 | Arbogast | 251/366 X |
| 3,989,280 | 11/1976 | Schwarz | 285/239 X |
| 4,140,058 | 2/1979 | Ballreich et al. | 156/73.1 X |
| 4,295,412 | 10/1981 | Hachiro | 137/454.2 X |
| 4,417,933 | 11/1983 | Bernat | 156/73.1 X |
| 4,492,249 | 1/1985 | Arino et al. | 137/515 |
| 4,697,608 | 10/1987 | Kolze et al. | 156/73.1 X |
| 4,712,809 | 12/1987 | Legris | 156/73.5 X |

Primary Examiner—Stephen M. Hepperle
Attorney, Agent, or Firm—McGlew & Tuttle

[57] ABSTRACT

An improvement is obtained in the valve body construction of a check valve which is insertable into the interior of a flexible hose, which valve body comprises a valve body portion having one of an inlet port and an outlet port, and a valve end piece having the other of the inlet and outlet ports, wherein the valve end piece is formed with annular grooves extending in the circumferential direction thereof along the opposite sides across a joint surface between the valve body portion and the valve end piece. With this advantageous construction, there will be no burrs extending outwardly from the joint surface when assembled by welding the mating members. Also, the improvement is furthered wherein the outer diameter of said valve body portion is made slightly greater than the inner diameter of said hose, said valve end piece being provided with a gradually enlarged diametered portion having a largest outer diameter equal to or slightly greater than the outer diameter of said valve body portion, and also with a shouldered portion behind said largest outer diametered portion.

1 Claim, 3 Drawing Sheets

CHECK VALVE INSERTABLE INTO A HOSE

FIELD OF THE INVENTION AND RELATED ART STATEMENT:

The present invention relates to improvement in or relating to a check valve element which is insertable into a flexible hose.

The typical construction of a conventional check valve is generally known such that its valve element may be caused to be opened only with a fluid pressure urging thereupon in the direction from the inlet port to the outlet port, thereby letting the fluid pass therethrough in this direction only, which valve is, for instance, employed in a negative-pressure type booster or pressure multiplying device for an automotive vehicle More specifically, among this type of devices as adapted in a hydraulic brake force multiplier device for the automobile, there is found a type of check valve which may be inserted in use into the inner diameter of a flexible hose for generating and maintaining a negative pressure within the device and wherein its negative pressure chamber is connected operatively to a negative pressure source by way of the flexible hose.

Referring to this type of construction of a typical conventional check valve, there is shown one incorporated within a flexible hose in FIG. 5 which is a cross-sectional view showing a check valve placed in the inside of a flexible hose and in FIG. 6 which is a fragmentary enlarged view showing only a part B of the check valve shown in FIG. 5. As shown in these drawing figures, a check valve body assembly 2 of conventional construction which may be inserted into the inner diameter of the flexible hose has its valve body portion 4 with an inlet port 3 and its valve end portion 6 with a passage 5 serving as an output port jointed together along a circumferential surface 7 thereof, thus being assembled as a unit.

In general, however, the valve body portion 4 and the valve end portion 6 of the valve body assembly 2 of this type are made of a plastic resin or the like material, and so, it is the practice that these valve parts 4, 6 are jointed together when assembled by, for instance, the ultrasonic welding process. Owing to the adoption of such a welding in practice of the joint of these valve parts 4, 6 along the circumferential surface of joint at 7, there may occasionally grow burrs from the welding operation which may very possibly extend into the outer circumference or towards a valve chamber 8 as shown by an arrow in FIG. 6 by way of the gap between these valve parts 4, 6. When installing this check valve assembly 1 with such burrs left into the inner diameter of a flexible hose 9, it is very possible that it may spoil the air-tightness of the hose or may cause a disadvantageous effect in the due performance of a check valve.

On the other hand, according to the general construction of a check valve assembly 1 inserted into the inside of the flexible hose 9, there is often seen provided an end portion 4a of a valve body portion 4 of the valve assembly 1 extending in the shape of a step or shoulder around the outer circumference of the valve end portion 6 by a thickness thereof when assembled together, as typically shown in FIG. 7. With this shouldered formation at the leading end of the valve body portion, when installing the check valve assembly 1 into the inner diameter of the hose 9, the shouldered leading end 4a of the valve body portion 4 may possibly abut against the end face of the hose 9, thus not only making it difficult to let the hose 9 override and pass through the shouldered end even by a substantial manual force, but also making it possible to have the inner circumferential portion near the end face of the hose 9 damaged when passing therethrough.

OBJECT AND SUMMARY OF THE INVENTION:

The present invention has been made essentially in an attempt to overcome such problems, and it is an object of the invention to provide a hose-insertable check valve with such a construction that when in assembly jointing valve body portions together by welding, it may present no burrs of such a material as a thermoplastic resin used from welding operation from extending into the outer circumference or into an inner gap leading to a valve chamber from a part welded.

It is another object of the invention to provide a check valve assembly which may present a smooth mounting of a flexible hose onto a check valve when assembled together, thereby making the installation easy, and thereby preventing possible damages in the inner circumference near the end face of the hose from occurring in this installation.

The construction of a check valve according to the present invention which may attain the objects noted above is highlighted by the following aspects (1) and (2);

(1) The present invention is essentially directed to the provision of an improvement to attain the objects stated above in a check valve insertable into the inner diameter of a flexible hose including a valve body having an inlet port and an outlet port, a valve element biased resiliently upon a valve seat provided on the part of the inlet port of the valve body and a biasing means adapted to continuously bias the valve element urging resiliently towards the inlet port, which comprises, as summarized in brief, a valve body portion with one of the inlet port or the outlet port and a valve end piece with the other of the inlet port or the outlet port, and wherein there is provided an annular groove in the outer circumference of either or both of the valve body portion and the valve end piece across the joint surface of these two members.

With this construction of a hose-insertable check valve, there can be attained an advantageous function such that burrs formed possibly when welding the valve body portion and the valve end piece together may be forced into the groove(s) provided in the outer circumference(s) of these two members across the joint surface therebetween so that the burrs may well be received and held by the groove(s) from extending any further into either the outer circumferential surface of the check valve or the valve chamber.

As is apparent to those skilled in the art from the statement above, according to the hose-inserted check valve of the present invention, it is assured that the management will not spoil the air-tightness of a flexible hose, or will not impair the due performance of the valve, when installed into the interior of the hose, at all. This effect may essentially be due to the advantage noted above that the welding burrs can be held by the grooves provided in those members from rendering any possible adverse effect.

(2) The present invention is also directed to the provision of an improvement in a check valve insertable into the inner diameter of a flexible hose including a valve body having an inlet port and an outlet port, a valve element biased resiliently upon a valve seat provided on the part of the inlet port of the valve body and a biasing means adapted to continuously bias the valve element urging resiliently towards the inlet port, which comprises, as summarized in brief, a valve body portion with one of the inlet port or the outlet port and a valve end piece with the other of the inlet port or the outlet port, and wherein the outer diameter of the valve body portion is made slightly greater than the inner diameter of the flexible hose, the valve end piece being formed with an outer end portion gradually enlarged in diameter, the extent of this enlarging in diameter being made equal to or slightly greater than the outer diameter of the valve body portion, and also formed with an annular step or shouldered portion extending along the circumferential direction.

With the advantageous provision of the gradually enlarging diametered portion of the valve end piece in the outer end thereof to provide a smooth gradation free from any obstacle, it is assured that the check valve may be inserted easily and smoothly into the inner diameter of the hose.

Also, as the annular step or shouldered portion formed behind the gradual enlarging portion of the valve end piece may afford a positive engagement with the inner circumference of the hose end portion when inserted with the check valve, thereby to afford an ensurance to prevent the check valve from displacing in the inside of the hose during the use.

As is reviewed fully in the foregoing description, there may be attained such advantageous effects from the improvement in the hose-insertable check valve construction according to the present invention such that it requires only a small manual force to insert the check valve assembly into the inner diameter of a flexible hose, making the installation job so easy, and so reducing the possibility of damages to be made in the inner circumference of the hose end portion when installed, accordingly.

Also, since the annular shouldered portion of the valve end piece may serve to provide a positive engagement with the inner circumference of the hose when installed, this can effect to prevent the check valve from displacing in the inside of the hose during the use, without any aid of a clamp or like fixture to put the valve in position.

DETAILED DESCRIPTION OF PREFERRED EMBODIMENTS:

The present invention will now be explained by way of a preferred embodiment thereof in conjunction with the accompanying drawings, as follows.

(First Embodiment)

Figure 1:
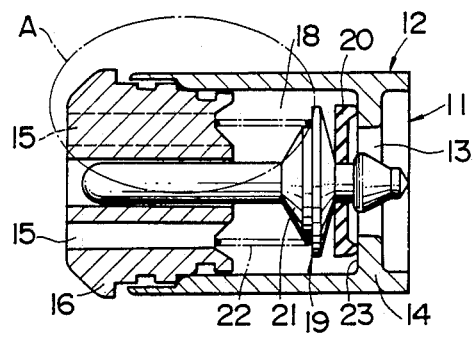
FIG. 1 is a longitudinal cross-sectional view showing a first embodiment of a hose-insertable check valve of the present invention.
Figure 2:
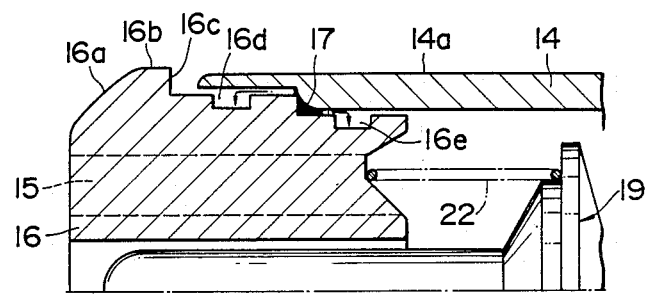
FIG. 2 is a fragmentary enlarged view showing, in cross-section, a part of the check valve designated at "A" in FIG. 1.
Figure 4:
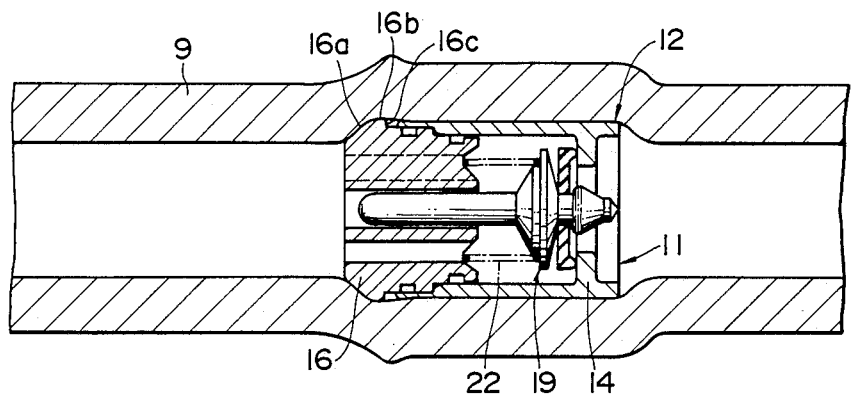
FIG. 4 is a cross-sectional view showing the state that a check valve by way of a preferred embodiment of the invention is placed in position in the inside of the hose.
Figure 5:
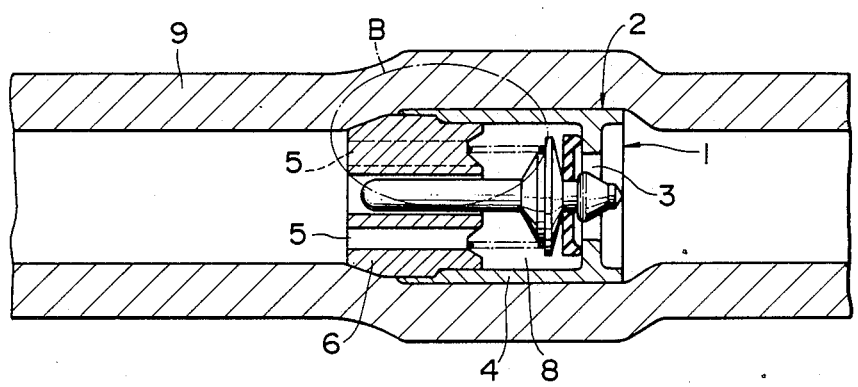
FIG. 5 is a cross-sectional view showing a typical conventional check valve installed in use position in the inside of the hose.
Figure 6:
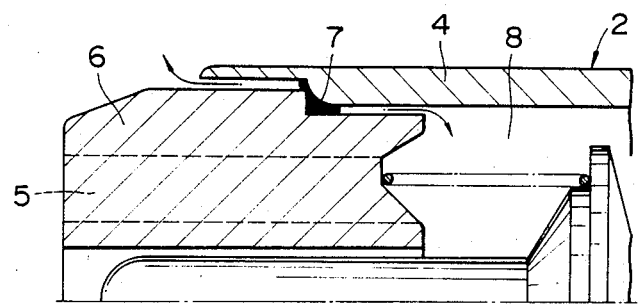
FIG. 6 is a fragmentary cross-sectional view showing in enlargement a part of the check valve alone designated at "B" in FIG. 5.
Figure 7:
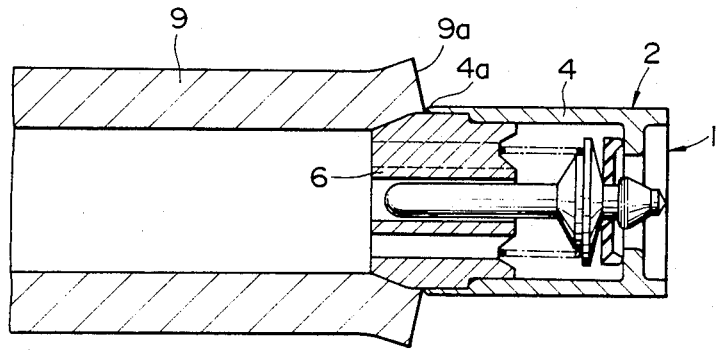
FIG. 7 is a longitudinal cross-sectional view showing the state that a typical conventional check valve is to be inserted into the inside of a hose.

Referring to FIG. 1, there is shown a longitudinal cross-sectional view showing generally an entire check valve assembly, FIG. 2 a fragmentary cross-sectional view showing a part of the check valve designated at "A" in FIG. 1, and FIG. 4 a cross-sectional view showing the state that the check valve assembly is placed in position within a flexible hose. In the drawings, there are shown provided a check valve assembly designated generally at the reference numeral 11, and a cylindrical valve body assembly at 12, the valve body assembly 12 comprising a valve body portion 14 having an inlet port 13 and a valve end piece 16 having a plurality of passages 15 as an outlet port, which members are jointed together at an annular joint surface 17 extending circumferentially therebetween. Also shown are a valve chamber 18, a valve element assembly 19 disposed in working position within the valve chamber 18, which is comprised of a cup-shaped valve member 20 and a valve holding member at 21, a coil spring 22 serving to normally bias the valve element assembly 19 towards the inlet port 13, and a valve seat at 23.

Along the outer circumference of the valve end piece 16, there is provided a gradually enlarged diametered portion 16a extending around the circumference thereof, the maximum or largest-diametered portion 16b is of an outer diameter which is equal to or slightly greater than the outer diametered portion 14a of the valve body portion 14, and there is also provided on the side of the opposite end a step or shouldered portion 16c behind the largest diametered portion 16b extending in the circumferential direction.

The valve end piece 16 is also provided with, by way of this preferred embodiment, two annular grooves 16d, 16e extending on the opposite sides of the joint surface 17 with the valve body portion 14. These two grooves 16d, 16e are provided to define a space for receiving burrs which may possibly be formed in the welding of the valve body portion 14 with the valve end piece 16.

It is the practice to joint the valve body portion 14 and the valve end piece 16 together when they are for example of a plastic resin, by welding them at the circumferential joint surface 17 thereof by way of the ultrasonic welding process, after having placed the valve element 19 and the coil spring 22 in position within the valve chamber 18, so that they are assembled to a check valve assembly 11. In this welding operation, there is a possibility that burrs may be produced from the joint surface 17. Thus-formed burrs of the plastic resin may be received into the annular grooves 16d, 16e provided in the valve end piece 16 on the outer circumferential surface thereof as shown by arrows in FIG. 2, thereby to efficiently prevent them from flowing or extending towards the outer circumference of the check valve 11 or into the valve chamber 18. With this advantageous arrangement, when thus-prepared check valve assembly 11 is put into a working position in the interior of the flexible hose 9, there is no fear that the air-tightness or other performances of the check valve may be spoiled in the operation, accordingly.

When installing the check valve assembly 11 into the interior of the flexible hose 9, it can be forced manually into a due position of the flexible hose 9 while being guided by the gradually enlarged portion 16a formed in the valve end piece 16 of the check valve assembly 11. FIG. 4 shows the state that the check valve assembly 11 is placed in position within the flexible hose 9.

Incidentally, while it is explained by way of a preferred embodiment that there are provided two annular grooves 16d, 16e extending along the outer circumference of the valve end piece 16 across the joint surface 17 to be jointed with the valve body portion 14, these grooves may of course be provided on the part of the valve body portion 14, or else may be provided one each on the both parts of the valve body portion 14 and the valve end piece 16, respectively.

(Second Embodiment)

Figure 3:
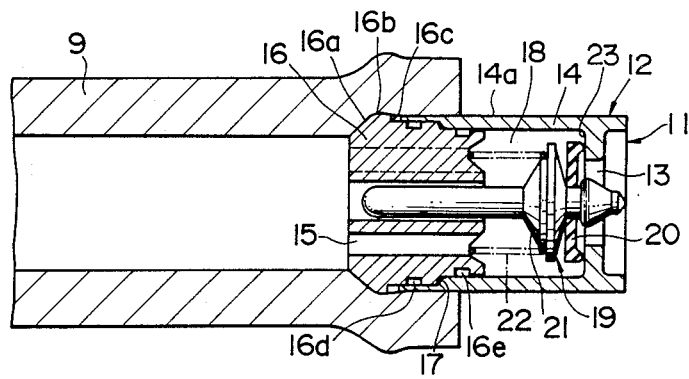
FIG. 3 is a longitudinal cross-sectional view showing a second embodiment of a hose-insertable check valve of the invention, and showing the state that the valve is to be installed into the inner diameter of a flexible hose.

Referring to FIG. 3, there is shown a longitudinal cross-sectional view showing the state that the check valve assembly 11 is underway to be inserted into a desired working position in the interior of the flexible hose, and referring to FIG. 4, shown is a like cross-sectional view with the check valve assembly placed in position within the flexible hose.

In the description to follow in conjunction with FIGS. 3 and 4, no further explanation will be repeated for clarity on like parts which are designated at like reference numerals.

Now, referring to FIGS. 3 and 4, if the valve body portion 14 and the valve end piece 16 are both made of, for instance, a plastic resin, they may be assembled together after disposing a valve element 19 and a coil spring 22 into a space defined within the valve chamber 18, for example, either by the ultrasonic welding or by a snapfitting construction formed in the both mating members, to eventually make a check valve assembly 11.

When installing the check valve assembly 11 into the interior of the flexible hose 9 as shown in FIGS. 3 and 4, the former may be forced manually into the latter while being guided by way of the gradually enlarged diametered portion 16a formed in the valve end piece 16 on the outer end side thereof, as typically shown in FIG. 3. With this advantageous arrangement of the enlarged portion 16a, it requires an initial manual force as small as approximately one third of that as required in the conventional arrangement to insert the check valve assembly 11 into the hose 9. More specifically, it was observed in practice of this embodiment of the present invention that it required only about 4 kilograms for the installation of the check valve assembly 11, while it was about 12 kilograms in the conventional check valve construction.

In this manner, it is to be noted that the check valve assembly 11 placed into the interior of the flexible hose 9 may not only be ensured with a due air-tightness, but also may be urged positively at its shouldered portion 16c formed in the behind of the largest outer diameter 16b of the gradually enlarged portion 16a together with the valve body portion 14 under a strong resilient force rendered from the inner circumference of the hose 9, thus making a due fixation or lodgement of the check valve assembly 11 in the interior of the flexible hose 9, accordingly.

While the description as disclosed herein is essentially directed to the improvement on a check valve insertable into the interior of a flexible hose, it is to be understood that the invention is not intended to be restricted in application to the details of the specific constructions disclosed herein, but to contrary, the invention can of course be adapted equally to any other means for a similar effect and performance in accordance with the foregoing teachings without being restricted thereto and without departing from the spirit and scope of the invention.

It is also to be understood that the appended claims are intended to cover all of such generic and specific features particular to the invention as disclosed herein and all statements relating to the scope of the invention, which might as a matter of language be taken to fall thereunder.

What is claimed is:

1. A check valve assembly insertable into the interior of a flexible hose, comprising: a valve body portion having one of an inlet port and an outlet port; and, a valve end piece having a port other than said one of an inlet port and an outlet port of said valve body portion, said valve body portion and said valve end piece being jointed together to embody said valve body means, said valve body portion having an internal surface with an internal large-diametrical portion and an internal small-diametrical portion forming a step or shouldered portion between said internal large-diametrical portion and internal small-diametrical portion, said valve end piece having an external large-diametrical portion and an external small-diametrical portion forming a valve end piece shouldered portion between said external large-diametrical portion and external small-diametrical portion, each of said external large-diametrical portion and said external small-diametrical portion and said external small-diametrical portion of said valve body portion, respectively, each of said shoulder portions defining a joint surface, said valve end piece having grooves formed at each side of said joint surface extending in a circumferential direction providing a reduction in the external diameter of said external large-diametrical portion and said external small-diametrical portion.

* * * * *